May 16, 1939. F. E. O'NEILL Re. 21,085

METHOD AND MEANS OF PERFORATING CASINGS

Original Filed Feb. 12, 1935 2 Sheets-Sheet 1

INVENTOR
FRANK E. O'NEILL
BY James M. Abbott
ATTORNEY

METHOD AND MEANS OF PERFORATING CASINGS

Original Filed Feb. 12, 1935 2 Sheets-Sheet 2

INVENTOR
FRANK E. O'NEILL
BY James M. Abbott
ATTORNEY

Reissued May 16, 1939 Re. 21,085

UNITED STATES PATENT OFFICE 21,085

METHOD AND MEANS OF PERFORATING CASINGS

Frank E. O'Neill, Los Angeles, Calif., assignor to Edith L. O'Neill, Glendale, Calif.

Original No. 2,034,768, dated March 24, 1936, Serial No. 6,184, February 12, 1935. Application for reissue March 24, 1938, Serial No. 197,972

11 Claims. (Cl. 166—1)

This invention relates to oil well operations and particularly pertains to a method and means of perforating oil well casings and the like.

When the casing has been set in oil wells preparatory to bringing in a producing well it is usual practice to perforate the casing adjacent the producing stratum of the earth formation penetrated by the casing. Various methods and mechanisms have been provided for this purpose, including mechanical perforators which expand from the inside of the casing and form holes through the casing wall. These devices are for the most part difficult to operate and do not extend their penetrating action further than the wall of the casing. It will be evident that better production of a well can be obtained if the earth formation around the perforations is also opened up to produce a more copious flow of fluid and it is the principal object of the present invention to provide a perforating apparatus which will not only perforate the casing but will desirably penetrate the formation.

It is common practice at the present time to maintain the well full of drilling fluid during certain stages of the production of the well, and due to the weight and the character of the drilling fluid there will thus be within the well a column of drilling fluid which will produce an enormous hydrostatic head and will create at the bottom of the well an appreciable hydraulic pressure. In normal well operations this hydraulic pressure will be of the order of one-half pound of pressure per square inch to the running foot of well bore. Heretofore when mechanical perforating devices have been used it has been necessary to manipulate them from the top of the well. It is another object of the present invention to provide perforating means, either actuated by the available hydraulic pressure provided with suitable fluid pumping means or directly utilizing the pressure fluid to perforate the well casing and to penetrate the formation therearound.

The present invention contemplates the provision of a perforating structure adapted to be lowered into a well in conjunction with the packer by which the fluid column of the well may be shut off from the perforating zone, and after which operation manipulation of the device from the top of the hole will release the pressure of the fluid column into the zone of perforation to create a perforating action due to said pressure.

The invention is illustrated by way of example in the accompanying drawings in which.

Figure 2:
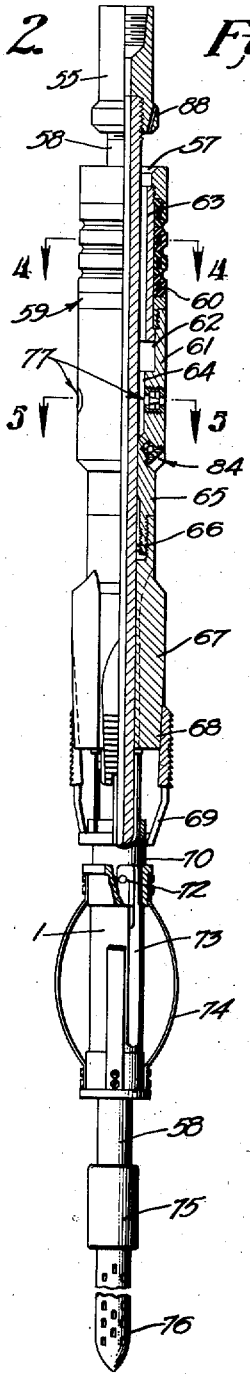
Fig. 2 is a view in longitudinal section and elevation showing the perforating unit with which the present invention is concerned.

Referring more particularly to the drawings, 10 indicates a well casing to be perforated by the device with which the present invention is concerned. 11 indicates a drill pipe adapted to be projected downwardly into the well casing and to carry the perforating structure. This structure comprises two units, the control unit shown in Fig. 1 of the drawings and the perforating unit shown in Fig. 2 of the drawings. The control unit comprises an upper collar 12 threaded at its upper end to receive the drill pipe 11 and threaded at its lower end to receive the cylindrical housing 13 of a trip valve 14. This valve is formed with a downwardly projecting member 15 at its lower end carried by a cylindrical body 16. This body may reciprocate vertically within a retainer sleeve 17 mounted in the upper end of the housing 13. Radial openings 18 are formed through the wall of the portion 16 and within these openings balls 19 are mounted for radial movement. Disposed within the cylindrical portion 16 of the valve is a plunger 20 which may reciprocate vertically and which is formed with an annular recess 21 adapted at a certain position of movement of the plunger to move downwardly into alignment with the balls 19 and to permit the balls to have inward radial movement. The plunger is provided with an enlarged head 22 at its upper end to be struck by a weighted object dropped downwardly through the drill pipe. The plunger 20, the cylindrical extension 16 of the valve, and the retainer sleeve 17 are so designed as to insure that when the plunger is in its uppermost position the balls 19 will be held outwardly to wedge against the lower face of the retainer sleeve 17 and to cause the balls to be thus locked in a position to hold the valve structure 14 in its lowermost position. In this lowermost position the extension 15 of the valve rests upon a valve ball 23 which is thus held seated in a closing position over a fluid passageway 24 formed in end wall 25 of the valve housing 13. A spring 26 is disposed between the end wall 25 and a shoulder on the valve structure 14 and tends to urge the entire valve unit to move in an upward direction. Fluid flow ducts 27 are formed radially through the valve structure 14 and communicate with the central bore 28 receiving the valve plunger 20. A central duct 29 is formed upwardly through the valve plunger to permit fluid to flow from the opening 24 through the valve and into the drill pipe 11 when the valve ball 23 is released from its seat.

A spring collar 30 is secured at the lower end of the valve housing 13 and is also attached to a tubular mandrel 31 which extends downwardly therefrom. The lower end of the tubular mandrel 31 is internally threaded and receives the upper extension of a main valve 32. Slidably mounted on the tubular mandrel adjacent its lower end is a packing box 33 which receives packing 34 and also carries a packing nut 35. The packing nut 35 circumscribes the tubular mandrel 31 and extends into the lower end of the packing box 33 so that the packing 34 may be tightened. The packing box 33 also carries a tubular valve seat 36 which cooperates with the main valve 32 to normally close the lower end of the mandrel 31. An adjustable tension nut 37 is threaded on to the upper end of the packing box 33 and has an end wall through which the mandrel 31 extends. Interposed between this end wall and the end face of the collar 30 is a helical expansion spring 38 which acts to force the member 30 and the member 37 apart so that the valve 32 will rest normally upon its valve seat 36. A central passageway 39 is formed through the valve 32 and a plurality of radial fluid inlets 40 are formed through the wall of the valve 32 to communicate with the central passageway 39. Thus when the valve 32 has moved to a lower position and is unseated with relation to the valve seat fluid may pass upwardly around the valve 32 and into the mandrel 31 through the openings 39 and 40. Disposed beneath the valve 32 and carried thereby is a circulating valve sleeve 41 within which an expansion spring 42 occurs. This spring acts to hold a circulating valve ball 43 on its seat to close the passageway 39 against the upward flow of fluid thereinto, except at such times as excessive fluid pressure is created within the drill string 11 and forces the ball valve downwardly from its seat. Mounted upon the lower end of the packing box 33 and extending downwardly to enclose the main valve 32 and the circulating valve 43 is a cylindrical valve housing 44, the lower end of which is closed save for a central threaded opening 45 into which an equalizing valve mandrel 46 is threaded. This mandrel extends downwardly into the central passageway of an equalizer valve body 47 and terminates in an enlarged head portion 48. A key 49 is interposed between the mandrel and the valve body 47 so that rotation of the mandrel and the valve body may be effected in unison. A packing nut 50 circumscribes the mandrel 46 and is adjustably mounted in the upper end of the valve body 47. The packing nut is formed with an annular recess 51 at its upper end having outlet ducts 52 in communication therewith. The equalizing mandrel 46 is formed with a plurality of radial openings 53 which may be brought to register with the annular passageway 52 when the mandrel is at the upper end of its stroke as limited by the head 48. Mounted at the lower end of the valve body 47 is a bottom sub 54, which has a lower threaded pin extending into the threaded opening of a valve collar 55 of the perforating unit shown in Fig. 2. The lower end of this valve collar is fitted with an enlarged valve member 56 having a tapered end face adapted to seat against a valve seat 57 under certain conditions, as will be hereinafter described. The valve collar is mounted on to the upper end of a tubular body member 58 which extends downwardly through a packing unit 59. This unit is here shown as comprising the upper valve seat 57, a plurality of resilient packing rings 60, and a base member 61. The base member is formed at its top with a counterbore 62 to receive a sleeve 63 which is circumscribed by the packing ring and which is threaded into the valve seat 57. The lower end of the sleeve is formed with a collar which limits its upward movement. A bore 64 extends downwardly from the counterbore and within the base 61. This bore is of a materially larger diameter than the tubular body member 58 which extends through it. Below the bore 64 a reduced bore 65 occurs which is of substantially the same diameter as that of the tubular body 58, and forms a sliding fit therewith. A packing gland 66 is carried at the lower end of the base 61 and around the body 58. Attached to the lower extension of the base 61 and threaded therewith is an expansion cone 67 around which a plurality of slips 68 are arranged. These slips are carried upon reins 69 pivoted to a slip rein collar 70 mounted at the upper end of a tubular cage 71. The body 58 telescopes through the tubular cage and carries a seating pin 72 which moves in a bayonet slot 73 to lock the cage 71 in position upon the body 58. The cage carries a plurality of bow-shaped anchor springs 74 which may engage the inner face of a casing within which the device is being used. The body 58 extends downwardly through the cage and carries a coupling 75 at its lower end which coupling in turn receives a perforated nipple 76 through which fluid may pass upwardly into the body 58 in a manner to be hereinafter described.

Figure 3:
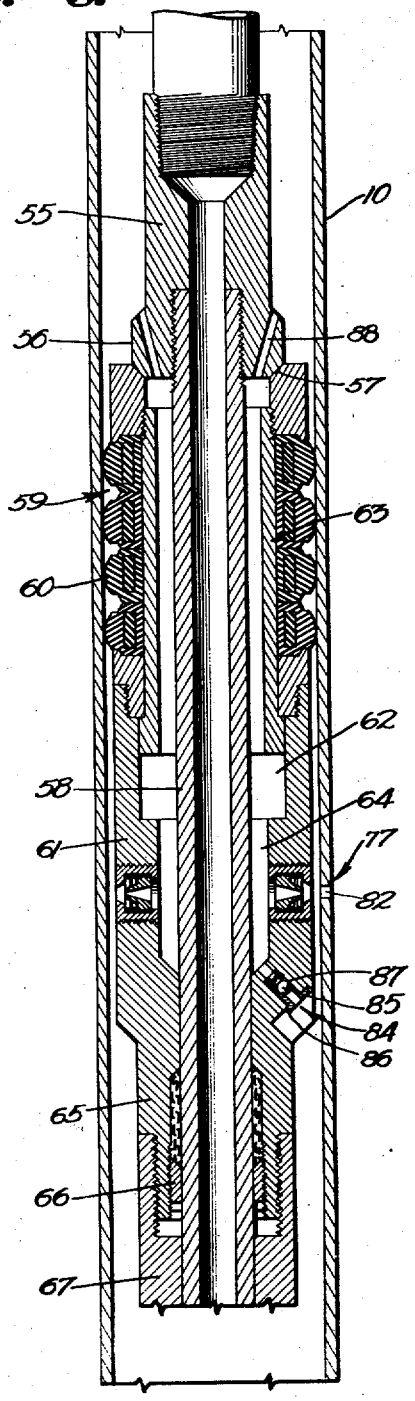
Fig. 3 is an enlarged view in central vertical section through the preferred form of perforating unit.
Figure 5:
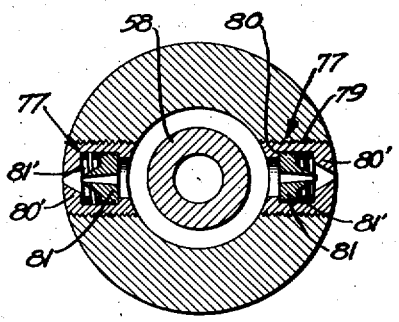
Fig. 5 is a view in transverse section as seen on the line 5—5 of Fig. 2 disclosing the perforating nozzles and their relation to the fluid passageway.
Figure 4:
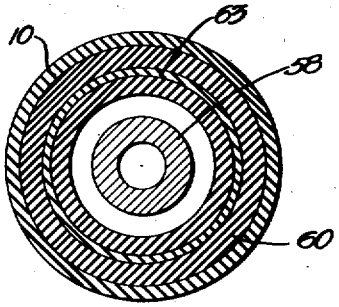
Fig. 4 is a view in transverse section through the perforating unit as seen on the line 4—4 of Fig. 2 disclosing the fluid passageway through the packer.

At a point in the length of the base 61, within which the bore 64 occurs, a plurality of perforating nozzles 77 are mounted. These nozzles are disposed within threaded radial bores 78. Each nozzle comprises an outer threaded sleeve 79 mounted within the bore 78 and having a shoulder 80 at the inner end of the bore, and a nozzle tip 81 slidable within member 79 and yieldably held in a retracted position by spring 81', and through which nozzle fluid may be projected from the bore 64 outwardly against a surrounding casing as the nozzle is forced outwardly to form a perforation as indicated at 82 in Fig. 3 of the drawings. A fluid circulating valve 84 is mounted through the wall of the base 61 and controls communication of fluid into the bore 64. The circulation valve structure 84 comprises a valve ball 85 adapted to rest against a removable valve seat 86 and held against this seat by a spring 87. Circulation openings 88 are formed through the valve head 56 of the valve collar 55 for a purpose to be hereinafter described.

Attention is directed to the fact that primarily the present invention is concerned with the beneficial action obtained by projecting a stream of liquid under pressure against the wall of the casing whereby an abrasive action will be produced to perforate the casing and to penetrate the geological formation through which the casing extends. The structure here shown provides means whereby the force of the liquid may be released from the impounded column above the packer 30 and projected through the nozzle units 77 against the surface to be abraded. It will be recognized that liquid may be forced downwardly and outwardly through the nozzles 77 by a force created by other means than the head of the accumulated column of impounded liquid, such for example as by the usual mud pump present at the well, and by which additional pressure can be imposed upon the liquid being forced downwardly and outwardly from the nozzles.

Figure 1:
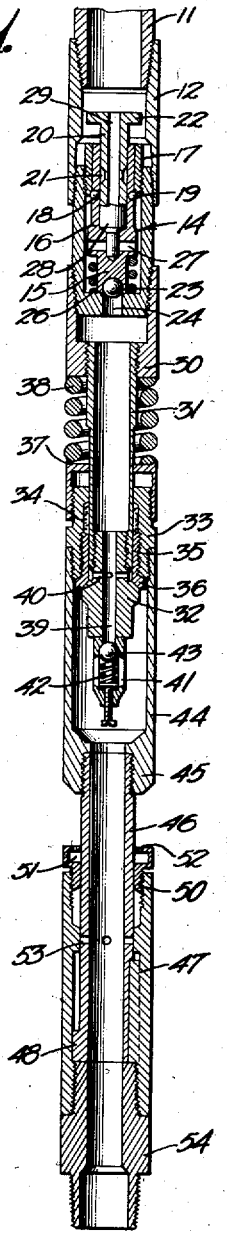
Figure 1 is a view in longitudinal section showing the control unit to which the perforating unit is attached and by which it is manipulated.

In the operation of the present invention the control unit as shown in Fig. 1 and the perforating unit as shown in Fig. 2, are assembled with the control unit uppermost and this structure is then mounted at the lower end of the drill pipe 11 to be inserted into the well. When the control unit is ready for insertion care must be taken to insure that the trip valve structure 14 shall be locked so that the valve ball 22 will be held firmly on its seat over the opening 24. In this position it will be recognized that the drill stem 11 will be sealed off from the fluid which will be penetrated as the tool is lowered into the hole. At the same time the spring 38 holds the mandrel 31 and the circulating valve housing 34 in a position to maintain the main valve 32 on its seat 36. The perforating unit is held in its locked position by the engagement of the lock pin 72 with the hooked upper end portion of the slot 73, at which time the slips 68 will be held in their lowermost position and the valve seat 57 will be held in its lowermost position and out of engagement with the valve member 56. As the entire assembled structure is lowered into the well the fluid present in the well may flow upwardly through the perforating nipples 76 into the body 58 of the perforating unit and then upwardly through the equalizing mandrel 46 and into the housing structure 44 where further upward flow of the fluid will be stopped by the valve 32 which is held in a closed position upon the seat 36 by the spring 38. If accidental movement of the member 44 occurs due to the fact that the perforating unit encounters an obstruction which prevents or retards its downward movement sufficiently to overcome the expansive action of the spring 38, or if the pressure of the fluids within the well should be sufficient to overcome the tension of the spring 38 the valve 32 might open and permit the fluid to enter the tubular mandrel 31. The further upward flow of fluid would, however, be prevented due to the fact that the valve ball 23 is locked on to its seat by the trip valve mechanism 14. Thus the upward limit of flow of fluid within the tool prior to the time the trip valve 14 is opened would be to this trip valve. It will be recognized that as the device is lowered into the well through the fluid it is necessary for the fluid to be bypassed through the packer. This is accomplished by the pressure of the fluid which lifts the valve ball 85 from its seat 86 and allows fluid to pass upwardly into the space 64 of the base 61 of the packer. This fluid will then pass upwardly through the member 63 and outwardly into the well casing 10 through the valve seat 57. Due to this arrangement there will be no difficulty in lowering the device into the well through the drilling fluid. When the device is at the position where perforations are to be made the drill stem 11 is manipulated so as to disengage the pin 72 carried on the body 58 from the hooked upper portion of the slot 73, thus permitting the body 58 to move downwardly while the cage 71 is frictionally held by engagement with the casing wall. As the body 58 moves downwardly the cone 67 will force the slips 68 outwardly to positively grip the wall and to prevent further downward movement of the structure which includes the cone 67, the base 61 and the packer 59. When the packer is thus moved to its limiting position the valve collar 55 and the valve 56 will move downwardly so that the valve 56 engages the valve seat 57 and exerts pressure to deform and distend the packing rings 63 and to cause them to expand into the casing 10 and to seal off all of the fluid column above the packing from the area of the casing below the packing. After the valve 56 has been thus set it will be evident that the valve 85 will be moved on to its seat to close the opening through the valve seat 84 and to prevent downward flow of fluid from the passageway 64. When the packer has been set as previously described a perforating operation may take place. This is brought about by the secondary action of the control unit. The first operation of the control unit after the packer is seated is for the collar 30 and the mandrel 31 to move downwardly so that the valve 32 will be lowered from its valve seat 36 and so that fluid may pass upwardly through the radial ducts 40 and into the central duct 39 of the valve element 36. When this has been established a flow of fluid may be subsequently permitted by dropping a weighted instrument, commonly called a go-devil, down through the drill pipe 11 until it strikes the head 22 of the plunger 20. At such a time the plunger will be moved downwardly to bring the annular recess 21 which is formed around its body into register with the balls 18, thus permitting them to move inwardly to a point of clearance and to allow the expansive action of spring 26 to move the valve element 15 upwardly so that the upward pressure of the fluid against valve 23 will lift it from its seat. The fluid from the well may then flow upwardly into the drill stem through the radial passageways 27 and the central passageway 28 of the member 16 and through the central passageway 29 of the plunger 20.

Prior to the time when the valves 32 and 23 of the control unit were opened there was a possibility that fluid from the column of fluid above the packer 59 might have free flow downwardly within the casing, thence through the ducts 88 in the valve head 56, and then downwardly through the packer 59 within sleeve member 63 and outwardly through the nozzle 77 into the casing. The fluid in the casing, both above and below the packing, will at this time be quiescent since the valves 32 and 23 are closed and prevent an upward circulation of the fluid of the well into the drill pipe which pipe is empty and is under normal atmospheric pressure. When it is desired to make the initial set of perforations in a well casing a go-devil is dropped down through the drill stem to strike the head 22 of the plunger 20 forming a part of the trip valve unit 14. Since the valve 32 has been previously opened the opening of the trip valve 14 will permit fluid to surge upwardly into the empty drill stem 11 and as the fluid which is within the portion of the casing 10 below the packer is forced upwardly the fluid in the casing 10 above the packer will be forced downwardly under its weight and pressure. This fluid will pass through the ducts 88 in the valve 56, thence through the sleeve 63 to the space 64 and then outwardly through the nozzle 77 under the pressure of the head of the column of fluid and at a high velocity. As the fluid forces its way outwardly through the nozzle tip it will also force the nozzle tip outwardly into close proximity to the casing wall. This will ensure that the fluid will be delivered directly to the surface to be abraded. The fluid will act by abrasion to cut perforations through the casing and will also act to penetrate formation through which the casing extends. The spent fluid will then flow downwardly on the opposite side of the casing or within it and find its way into the perforated nipple and thereafter will flow upwardly into the drill stem.

It will be evident that the prime feature of invention is the abrasion of the wall of the casing at a desired depth within a well and by the action of the liquid which is ejected forcefully from the nozzles. It will be understood that if deemed desirable the positive pressure created by a pump may be imposed upon the liquid to force it from the nozzles instead of utilizing the static pressure of a column of liquid impounded within a well bore. In either of which events the liquid will be projected at high velocity against the wall of the well casing to perforate the same and to open up the formation therearound.

In the event it is desired to form other perforation operations the weight of the drill stem may be relieved from the perforating unit and the drill stem with the valve 32 may be drawn upwardly as the spring 38 expands so that the valve 32 will engage the seat 36. By this operation the upward fluid flow into the drill stem may be interrupted, after which the structure may be further raised to relieve the pressure of the valve 56 from the valve seat 57 so that the packer may be released and moved to a different level than the casing. When the packer is again set by imposing pressure on the packer and expanding cone to force the slips into a setting position a further lowering of the drill stem will move the valve 32 from its seat and permit an upward surge of fluid to again take place into the drill stem accompanied by a downward surge of fluid from the column above the packer and outwardly through the nozzles 77 to form another perforating operation. This operation may be repeated so long as there is a sufficient difference in pressure between the column of fluid within the casing and the column of fluid within the drill stem. It will be evident, however, that eventually the two columns of fluid will equalize each other as to pressure, at which time it will be necessary to elevate the entire tool, drain and drill stem, and renew the cycle of operations if desired. When the device is to be withdrawn from the well it may be necessary to insure that there is no swabbing action of the packer, and particularly if the device is withdrawn before the fluid columns within the drill stem and the casing become equalized. For that reason the equalizing valve structure has been provided which will cause the ducts 53 in the equalizing mandrel 46 to move into register with the annular space 51 of the packing nut 50 and will permit fluid to pass through the opening 52 so that the pressure will be equalized through the tool as it is withdrawn.

The invention as here disclosed has been concerned with the direct perforation of a well casing by the abrasive action of a high velocity stream of liquid caused to flow by the control of valve means associated with the device.

It will thus be seen that by the operation of the device here shown it is possible to perforate a casing by utilizing the pressure and abrasive action of the column of fluid present within the casing at the time the perforating operation is carried out, and to insure that this operation may be easily brought about by the simple manipulation of the drill stem from the top of the well.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A method of perforating a well casing at the bottom of a well which consists in lowering a device into the well and submerging the same within the column of liquid present within the well, thereafter packing off the column of liquid within the well, and then establishing communication between a casing perforator responsive to fluid flow and a compartment at reduced pressure whereby fluid from the column within the well may pass downwardly through the casing perforator responsive to fluid flow and to cause actuation of the same.

2. A method of perforating a well casing within which well a column of fluid stands, which method consists in introducing a perforating nozzle into the well and submerging it within the fluid, thereafter shutting off the column of fluid within the well to establish a fluid head and then establishing communication between said fluid column and an area of reduced pressure from a point below the perforating nozzle whereby a flow of fluid will be established from the column through the point of shut off and the perforating nozzle and thence into a column under reduced pressure.

3. A method of perforating a well casing within which casing a column of liquid stands, which method consists in introducing a closed conduit into the well and submerging the same within the fluid, said conduit carrying a packer, a perforating nozzle and a valve adjacent its lower end, thereafter setting the packer to establish a definite liquid head within the casing, then opening the valve to release the fluid below the packer, whereby the liquid in the column above the packer will flow downwardly and outwardly through the perforating nozzles to impinge against the casing wall and will then flow upwardly through the valve and into the drill stem.

4. A device of the class described comprising a drill stem adapted to be lowered into a well containing liquid, a packer carried by the drill stem adjacent its lower end, a nozzle carried by the drill stem at a point below the packer and in communication with the column of fluid within the well and above the packer, and a valve in the drill stem adjacent its lower end whereby when the valve is opened liquid from the column above the packer may pass outwardly through the nozzle below the packer and then pass upwardly through the valve and into the drill stem.

5. A well casing perforator comprising a drill pipe adapted to be lowered into a well casing containing drilling fluid, a packer carried on the drill pipe adjacent the lower end thereof, said pipe having a passageway through the packer, a valve adjacent the lower end of the drill pipe and adapted to be operated from above ground, to establish and interrupt communication between the well and the pipe, and a perforating device carried by the pipe at a point below the packer and being in constant communication with the liquid in the well above the packer whereby when the valve is opened a downward flow of liquid from above the packer and through the perforating device may take place, after which said liquid may flow upwardly through the open valve and into the drill stem.

6. A well casing perforator comprising a drill pipe adapted to be lowered into a well casing containing drilling fluid, a packer carried on the drill pipe adjacent the lower end thereof, said pipe having a passageway through the packer, a valve adjacent the lower end of the drill pipe and adapted to be operated from above ground, to establish and interrupt communication between the well and the pipe, a perforating device carried by the pipe at a point below the packer and being in constant communication with the liquid in the well above the packer whereby when the valve is opened a downward flow of liquid from above the packer and through the perforating device may take place, after which said liquid may flow upwardly through the open valve and into the drill stem, and an equalizer valve normally closed and adapted to open when the device is withdrawn from a well to break the fluid seal around the packer.

7. A casing perforating tool adapted to be inserted into a well which is filled with drilling fluid, which tool comprises a tubular member extending down into the well to a point below the area of the casing to be perforated, a packer through which said tubing extends, said packer including means to set the same at a desired position within the well, a perforating nozzle carried below the packer and communicating with a fluid bypass through the packer and exteriorly of the tubular member, valve means within the tubular member and adapted to be manipulated to establish and interrupt a flow of fluid from the portion of the well below the packer upwardly into the tubular member, and a second valve disposed within the tubular member at a point above the first named valve, said second valve being closed normally and being adapted to be opened independently of the first named valve.

8. A casing perforating tool adapted to be inserted into a well which is filled with drilling fluid, which tool comprises a tubular member extending down into the well to a point below the area of the casing to be perforated, a packer through which said tubing extends, said packer including means to set the same at a desired position within the well, a perforating nozzle carried below the packer and communicating with a fluid bypass through the packer and exteriorly of the tubular member, valve means within the tubular member and adapted to be manipulated to establish and interrupt a flow of fluid from the portion of the well below the packer upwardly into the tubular member, a second valve disposed within the tubular member at a point above the first named valve, said second valve being closed normally and being adapted to be opened independently of the first named valve, and an equalizer valve disposed in the tubular member and adapted to permit a flow of fluid through the portion of the tubular member which extends through the packer when the device is being withdrawn from the well.

9. A method of perforating the casing of an oil well filled with drilling fluid which consists in lowering a fluid flow responsive device into the well and submerging the same in the column of liquid standing in the well, thereafter packing off the column of liquid within the well, and then establishing communication between the column of liquid above the point of packing off and a compartment under condition of atmospheric pressure whereby the fluid from the column above the point of packing off will pass through the flow device and will project a jet of said fluid against the casing wall to abrade and perforate the same.

10. A method of perforating a well casing, which consists in lowering a device into a well, which device carries means whereby a jet of liquid may be projected to impinge against the wall of the well casing and then projecting abrasive liquid under pressure through said means and against the well casing to perforate the same by abrasion.

11. A method of perforating a well casing at the bottom of the well, which consists in lowering a nozzle element into the well to the point of perforation, said nozzle extending laterally, thereafter forcing an abrasive liquid through said nozzle to impinge against the surface of the well casing to form a perforation through the casing by abrasion.

FRANK E. O'NEILL.